US012723567B2

(12) United States Patent
Zech et al.

(10) Patent No.: US 12,723,567 B2
(45) Date of Patent: Sep. 1, 2026

(54) VIBRATION ABSORBER ARRANGEMENT FOR REDUCING THE TRANSMISSION OF VIBRATIONS

(71) Applicant: WÖLFEL ENGINEERING GMBH + CO. KG, Höchberg (DE)

(72) Inventors: Philipp Zech, Höchberg (DE); Manuel Eckstein, Höchberg (DE); Dipl.-Ing. Oliver Eichelhard, Höchberg (DE)

(73) Assignee: Wölfel Engineering GmbH + Co. KG, Höchberg (DE)

( * ) Notice: Subject to any disclaimer, the term of this patent is extended or adjusted under 35 U.S.C. 154(b) by 0 days.

(21) Appl. No.: 19/485,887

(22) PCT Filed: Nov. 14, 2024

(86) PCT No.: PCT/EP2024/082439
§ 371 (c)(1),
(2) Date: Nov. 19, 2025

(87) PCT Pub. No.: WO2025/108833
PCT Pub. Date: May 30, 2025

(65) Prior Publication Data

US 2026/0110289 A1 Apr. 23, 2026

(30) Foreign Application Priority Data

Nov. 22, 2023 (EP) .................................... 23211532

(51) Int. Cl.
*F03D 7/02* (2006.01)

(52) U.S. Cl.
CPC ......... *F03D 7/0298* (2023.08); *F03D 7/0296* (2013.01); *F03D 7/0302* (2023.08); *F05B 2260/964* (2013.01); *F05B 2270/334* (2013.01)

(58) Field of Classification Search
CPC ................. F03D 7/0296; F03D 7/0298; F05B 2270/334; F05B 2260/96
See application file for complete search history.

(56) References Cited

U.S. PATENT DOCUMENTS 6,213,721 B1 * 4/2001 Watkinson ............. F03D 80/00 416/119
6,672,837 B1 * 1/2004 Veldkamp ................ F16F 7/10 416/500

(Continued)

FOREIGN PATENT DOCUMENTS

CN 102734079 A 10/2012
CN 114151274 3/2022

(Continued)

OTHER PUBLICATIONS

Decision to grant patent—machine translation (Year: 2025).*

(Continued)

*Primary Examiner* — Brian Christopher Delrue
(74) *Attorney, Agent, or Firm* — C. Tumey Law Group PLLC

(57) ABSTRACT

The invention relates to a vibration damper assembly (40; 140) for an elongate first component (10; 30), which is arranged at a connecting end (11; 31) in a longitudinal direction (LD) of the first component (10; 30) for mechanical connection to a second component (20). The vibration damper assembly (40; 140) comprises at least two damper groups (41*a*, 41*b*, 41*c*, 41*d*, 41*e*) which are arranged in an end section (12; 32) of the first component (10; 30) with the connection end (11; 31) and are spaced apart from one another in the longitudinal direction (LD), wherein each of the damper groups (41*a*, 41*b*, 41*c*, 41*d*, 41*e*) comprises a plurality of individual vibration dampers (42*a*, 42*b*, 42*c*, 42*d*, 42*e*) which are arranged distributed on a circumferential wall (14) of the first component (10; 30) in a circum- (Continued)

Figure 1:
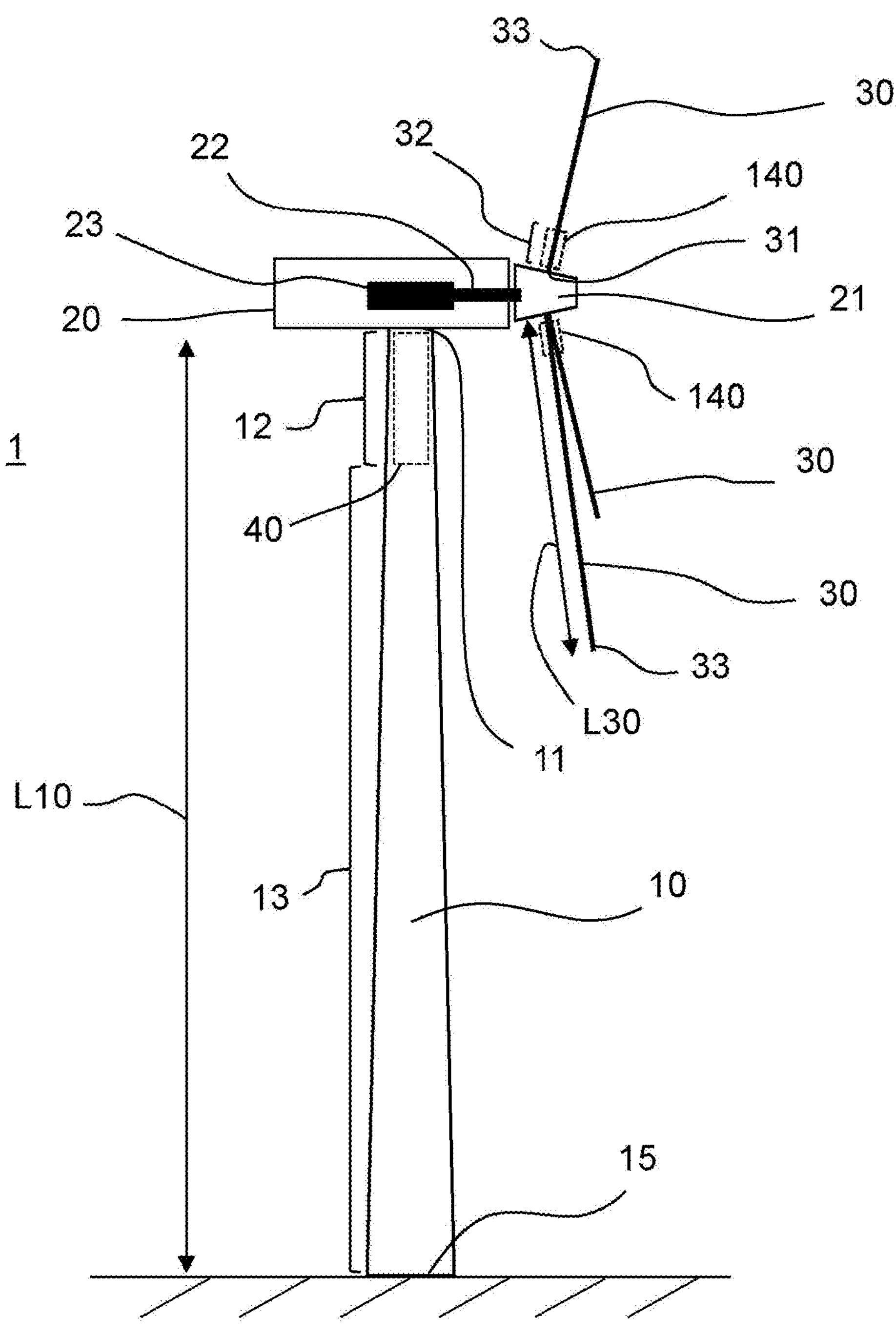

ferential direction (CD). In order to reduce the problems caused by tonalities in wind energy installations (1) in a simple and cost-effective way, the damper groups have different natural frequencies from each other. The invention also relates to a wind energy installation (1).

13 Claims, 2 Drawing Sheets

(56) References Cited

U.S. PATENT DOCUMENTS 8,167,556 B2 * 5/2012 Bjerge .................... H02P 9/006 416/500
8,471,396 B2 * 6/2013 Roddier ................ F03D 7/0204 290/44
8,878,377 B2 * 11/2014 Ollgaard ................. F03D 13/20 290/55
10,400,754 B2 * 9/2019 Rodriguez Tsouroukdissian ........ F16F 15/02
10,408,194 B2 * 9/2019 Drobietz ................. F03D 80/88
10,774,893 B2 * 9/2020 Bergua .................... F03D 13/25
10,907,617 B2 * 2/2021 Caponetti ............... F03D 7/047
12,173,693 B2 * 12/2024 Kammer ............... F03D 7/0224
2011/0150631 A1 * 6/2011 Choi ....................... F03D 80/00 29/889
2013/0195653 A1 * 8/2013 Hayashi ................ F03D 7/0296 416/1
2013/0259684 A1 10/2013 Hedeen et al.
2013/0280064 A1 * 10/2013 van Steinvoren ....... F03D 13/35 416/1
2014/0301846 A1 * 10/2014 Zhu ........................ F03D 80/00 416/146 R
2016/0265514 A1 * 9/2016 Cook ...................... F03D 13/10
2017/0101982 A1 * 4/2017 Ozcan ..................... E04H 12/08
2020/0158083 A1 * 5/2020 Nitsche ................. F16F 7/1028
2020/0271183 A1 * 8/2020 Jiang ....................... F16F 15/08
2021/0017784 A1 * 1/2021 Ma .......................... F03D 13/10
2021/0047998 A1 * 2/2021 Mitsch .................. F03D 7/0296
2021/0246880 A1 * 8/2021 Johansen ................ F03D 13/35
2023/0154448 A1 * 5/2023 Gupta ....................... F03D 9/25 416/244 R

FOREIGN PATENT DOCUMENTS

EP 2505825 A2 * 10/2012 ............. F03D 80/00
EP 3211218 8/2017
EP 3211218 A1 * 8/2017 ............. F03D 80/88
EP 2238347 9/2018
EP 2238347 B1 * 9/2018 ............. F03D 80/00
JP 2016133226 A 7/2016
WO 2016087030 A1 6/2016

OTHER PUBLICATIONS

German Search Opinion Translated (Year: 2025).*

Chinese Office Action for CN Patent Application No. 202480035257.2 dated May 17, 2026. English Translation with Original Untranslated Version, PDF file. 16 pages.

Alexander, Nocholas A. et al. “Exploring the performance of a nonlinear tuned mass damper.” Journal of Sound and Vibration, vol. 319, Issues 1-2, Jan. 9, 2009, pp. 445-462. PDF file. 18 pages.

Sondergaard, Sebastian H. et al. “On reduction of noise emission from thin-walled slender tubes by means of acoustic metamaterial.” presented at EURODYN 2023, XII International Conference on Structural Dynamics, Delft, Jul. 2 to 5, 2023.

Opposition against European Patent EP 4560135 (Application No. 23211532.9) dated Jun. 3, 2026. PDF file. 60 pages.

* cited by examiner

VIBRATION ABSORBER ARRANGEMENT FOR REDUCING THE TRANSMISSION OF VIBRATIONS

The invention relates to a vibration damper arrangement for an elongated first component, which is arranged at a connection end along a longitudinal direction of the first component for mechanical connection to a second component.

A typical wind turbine comprises a tower, a nacelle with a rotor hub, and several rotor blades, each of which is attached to the rotor hub. During operation, vibrations occur and the wind turbine releases sound emissions. So-called “tonalities” in the sound emissions of the wind turbine are perceived as particularly disturbing. They can lead to violations of legal restrictions on noise emissions. Under certain circumstances, the power of the wind turbine must be reduced in order to lower the noise emissions. This leads to economic disadvantages.

The cause of the tonalities are vibration sources in a drive train of the wind turbine. The drive train includes, for example, a generator and a gearbox. The drive train, in particular the generator and gearbox, are located in the nacelle. The vibrations generated there are transmitted to the rotor blades and the tower, and they are further propagated therein, respectively. The main acoustic emitters of the tonalities are the tower and rotor blades, not the nacelle itself.

According to a known approach, attempts are made to dampen the vibrations directly at the drive train. With this approach, the vibrations are reduced before they are transmitted from the nacelle to the tower and the rotor blades. Vibration reduction directly at the drive train is possible by means of passive and active vibration dampers. The design of active and passive vibration dampers on the drive train first requires a characterization of the tonality problems, i.e., the determination of relevant frequencies and tonal audibilities. Then usually an investigation of the vibrations in the drive train during operation by using a large number of acceleration sensors and measurement data follows. From the results-based on the vibration modes during operation and the acoustics-suitable positions for vibration dampers are derived. This is followed by an analysis of the available installation space and design tasks for implementing a vibration damper solution on the drive train. The design of active and passive vibration dampers directly on the drive train is therefore very complex. In addition, there is the problem that the installation space on the drive train is very limited.

Passive vibration dampers on the drive train have the disadvantage that they only work in a narrow band. This means that they are only effective in a small frequency range. Active vibration dampers on the drive train are very powerful, but also expensive. Especially for minor tonality problems, a solution using active vibration dampers on the drive train can be disproportionately costly.

U.S. Pat. No. 10,408,194 B2 showed an acoustic damping system for a tower of a wind turbine. The approach is to dampen the tower on a large area with respect to vibrations. For this, it is necessary to install vibration dampers at all locations on the tower with vibrations exceeding a certain threshold value. The vibration dampers must be distributed over a large area of the tower and installed at many different locations on the tower. Such large-area damping with vibration dampers at many different locations on the tower is disadvantageous due to the high costs, the high additional weight of the vibration dampers, and the effort required.

Another approach is sufficient stiffening of the respective main emitter. However, due to the high masses, effort, and costs required, this approach also has disadvantages.

EP 3 211 218 A1 discloses an acoustic damping system for a wind turbine tower.

Further, EP 2 238 347 A2 deals with a method for reducing sound emissions from a wind turbine tower, and with a wind turbine.

In CN 114 151 274 A, a rotor blade for a wind turbine with a plurality of wind-resistant damping parts is shown.

The object underlying the invention is to reduce the problems due to tonalities in wind turbines in a simple and cost-effective manner.

This problem is solved by a vibration damper arrangement with the features of claim 1.

The vibration damper arrangement is for an elongated first component which is configured, at a connection end (along a longitudinal direction of the first component), for mechanical connection to a second component.

The vibration damper arrangement comprises at least two damper groups which are arranged in an end section of the first component with the connection end and are spaced apart from one another along the longitudinal direction.

Each of the damper groups comprises a plurality of individual vibration dampers which are distributed along a circumferential direction on a circumferential wall of the first component.

The vibration damper arrangement is suitable and/or configured to reduce the transmission of vibrations from the connection end, in particular to reduce the transmission of vibrations from the connection end to a section of the first component beyond the end section.

The transmission of vibrations caused by vibrations in the drive train is reduced locally in the end section at the connection end, for example in an end section of a tower head or in an end section at the root of a rotor blade. No further vibration damping needs to be implemented on the first component, for example the tower or the rotor blade, beyond the end section. This means that the first component does not need to be damped “globally”. This ensures low costs.

The vibration damper arrangement shields the rest of the first component from the vibrations that are introduced at the connection end.

The invention is described below based on its use in a wind turbine. However, it can also be used in other slender structures and components.

According to one aspect, the first component may be at least partially hollow.

In one embodiment, the individual vibration dampers of the respective damper groups are arranged in a ring shape. Each damper group forms a “damper ring”. The damper rings are spaced apart from each other in the longitudinal direction. All damper rings are arranged in the end section. This allows for easy planning and installation.

In a modification, the vibration damper arrangement comprises at least three damper groups (e.g., damper rings). In particular, the vibration damper arrangement may comprise at least five damper groups (e.g., damper rings).

In one embodiment, the vibration damper arrangement comprises a maximum of twelve damper groups (e.g., damper rings). It has turned out that the tonalities can be coped with sufficiently in this manner. A smaller number of damper groups saves effort and costs.

According to one aspect, individual vibration dampers in the end section can be arranged on behind the other in the longitudinal direction spaced apart from each other. The "longitudinal assembly" is repeated in the circumferential direction spaced apart from each other at angular intervals, preferably around the entire circumference. With this, the damper groups spaced apart from each other along the longitudinal direction are formed.

According to one aspect, the individual vibration dampers of the respective damper group can be arranged evenly along the circumferential direction. For example, they can be arranged at equal intervals along the circumferential direction and/or at equal angular intervals around a (maybe local) longitudinal axis and/or center axis of the first component at the location of the respective damper ring.

The second component can be a wind turbine nacelle. The connection end is the nacelle-side end of the first component. The end section is a nacelle-side end section. Although the origin of the tonalities of the wind turbines are vibration sources in the drive train in the nacelle, the nacelle is not the main acoustic emitter of the disturbing sound emissions. The main acoustic emitters are the tower and the rotor blades of the wind turbine. It is sufficient to reduce the transmission of vibrations in the nacelle-side end section. Although the vibrations at the connection end (at the nacelle-side end) of the first component can still be transferred to the first component, their further transmission in the first component is reduced in the (nacelle-side) end section. They cannot spread freely and a risk of the emission of disturbing tonalities is reduced. An active and/or passive vibration damper in the nacelle itself can be omitted, if applicable. This saves costs and installation space in the nacelle.

In one embodiment, the first component is a wind turbine tower and the connection end is an upper end of the wind turbine tower for supporting the wind turbine nacelle.

The wind turbine tower is a tower of a wind turbine or a tower for a wind turbine.

In this case, the end section is an upper portion of the tower (a tower head). The complete vibration damper arrangement can be installed locally in the tower head. The nacelle rests on the tower head. Vibrations from the nacelle are transmitted to the tower head via the connection, but they are reduced by the vibration damper arrangement already inside the tower head.

According to one aspect, especially if the first component is the tower, adjacent damper groups may be spaced apart less than 300 cm along the longitudinal direction, for example less than 110 cm. Alternatively or additionally, the individual vibration dampers within the respective damper group may be spaced apart by less than 200 cm, for example by less than 66 cm, along the circumferential direction.

It has turned out that such arrangements are advantageous for exemplary towers made of steel with total heights between 50 m and 150 m, average diameters between 3 m and 5 m, and average wall thicknesses between 2 cm and 5 cm. For example, the above criteria respectively help to realize a reduction in vibrations in the important frequency range around 100 Hz.

According to another aspect, the second component may be the wind turbine nacelle with a rotor hub. The first component may be a wind turbine rotor blade, wherein the connecting end is a blade root (of the rotor blade) for attachment to the rotor hub.

The wind turbine rotor blade is a rotor blade of a wind turbine or a rotor blade for a wind turbine.

According to one aspect, especially if the first component is the rotor blade, adjacent damper groups may be spaced apart less than 300 cm along the longitudinal direction, for example less than 90 cm. Alternatively or additionally, the individual vibration dampers within the respective damper group may be spaced apart less than 100 cm along the circumferential direction, for example less than 34 cm apart. This applies to 50 m long blades with average diameters between 0.5 m and 1.5 m and a wall thickness between 1 cm and 3 cm.

A significant reduction in the transmission of vibrations is achieved if maximum distances between the individual vibration dampers within a respective damper group in the circumferential direction and maximum distances (along the longitudinal direction) between the damper groups are not exceeded. The maximum distances can be determined by simulation and/or measurement. They may differ for different variants of towers and rotor blades.

According to one aspect, the damper groups (the individual vibration dampers) are attached to an inner side of the circumferential wall. This protects the vibration dampers from weather influences and facilitates the installation.

In one modification, the natural frequencies of the damper groups are in a range from 50 Hz to 500 Hz. In practice, vibrations in this range are often responsible for disturbing tonalities, which is why their transmission should be particularly reduced.

Within the respective damper group, all individual vibration dampers can have the same natural frequency. Alternatively or additionally, all individual vibration dampers within each damper group can be of the same type. Especially, all individual vibration dampers within each damper group can be of identical construction.

The natural frequency of the respective individual vibration damper can be designed by means of a damper mass and a stiffness of the individual vibration damper.

In one embodiment, the damper groups have different natural frequencies. Each damper group has an individual natural frequency. This enables a wider band reduction of vibrations and/or a reduction in several frequency ranges. In one embodiment, each of the natural frequencies of the damper groups is designed for a target frequency, respectively, in order to reduce the tonality of the wind turbine.

The individual vibration dampers of a respective damper group may differ from the individual vibration dampers of the other damper groups in terms of their damper mass and/or stiffness. This is an effective approach for implementing vibration reduction for different frequencies or frequency ranges.

The respective damper group may have a frequency reduction range around its natural frequency. In one embodiment, the frequency reduction range of a respective damper group overlaps with at least one of the frequency reduction ranges of another one of the damper groups. The frequency reduction range may comprise the frequency range around the natural frequency, until a reduction to 80% of the reduction at the natural frequency has been reached.

According to a further aspect, each damper group comprises at least 5 vibration dampers. This helps to enable a high reduction of the transmission of vibrations.

In a modification, at least one of the damper groups is arranged in a portion extending from the connection end over 10% of a total length of the first component along the longitudinal direction. By this, at least part of the vibrations is reduced in the direct vicinity of the connection end, at which the vibrations are introduced into the first component. In particular, at least two or even at least three of the damper groups may be arranged in the portion extending from the connection end over 10% of the total length of the first component along the longitudinal direction.

In one embodiment, the end portion extends from the connection end over 14% at the maximum. The end section does not extend far from the connection end. The reduction of the vibrations occurs near the connection end, at which the vibrations being decisive for the tonalities are introduced. This prevents the first component from acting as a strong main acoustic emitter with a large area.

Alternatively or additionally, the vibration damper arrangement can be located entirely in the end section. All individual vibration dampers of the vibration damper arrangement are located within the end section only. Outside the end section, the vibration damper arrangement has no vibration dampers on the first component.

In a modification, all individual vibration dampers are passive vibration dampers. Passive vibration dampers are easier to design and more cost-effective. The disadvantage of narrow bandwidth can be compensated for by providing several damper groups. The passive vibration dampers can comprise the damper mass and a stiffness. The damper mass is mechanically coupled to the first component via the stiffness. The passive vibration dampers can be made of metal, for example steel. They can have steel stiffnesses.

The frequency range (or the frequency ranges) and the desired amplitude reduction can be designed by adjusting the spacing of the damper groups along the longitudinal direction, the number of individual vibration dampers per damper group, the damper masses of the individual vibration dampers, the number of damper groups, and the tuning of the natural frequencies of the damper groups.

The individual vibration dampers can be respectively attached to the first component by means of a magnetic base, adhesive, screws, and/or welding.

The above-mentioned problem is further solved by a first component, for example a wind turbine tower or a wind turbine rotor blade, which comprises the vibration damper arrangement according to any one of the described embodiments.

The above-mentioned problem is also solved by a wind turbine comprising a vibration damper arrangement according to any one of the described embodiments.

The embodiments and advantages described above apply accordingly.

The invention is explained in the following with reference to embodiments and with reference to the figures. All the features described and/or illustrated graphically here form the subject matter of the invention, either alone or in any desired combination, regardless of how they are combined in the claims or in their references back to preceding claims.

Figure 2:
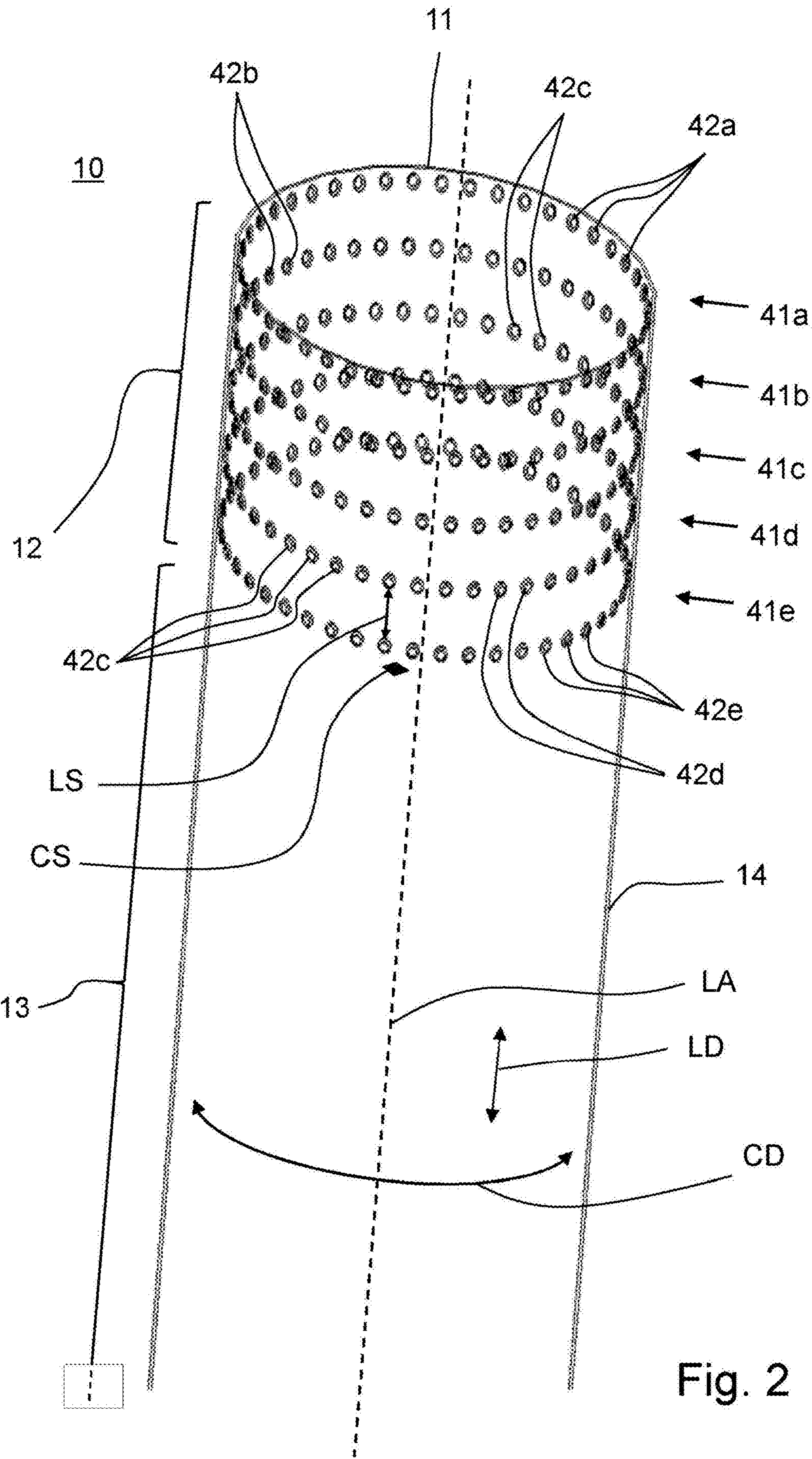

The figures show schematically:

FIG. 1 a wind turbine with a tower, a nacelle, and several rotor blades, wherein the tower and the rotor blades each have a vibration damping arrangement;

FIG. 2 an embodiment of a vibration damping arrangement for the tower of the wind turbine in FIG. 1.

FIG. 1 shows a side view of an embodiment of a wind turbine 1 with a tower 10, a nacelle 20, and several rotor blades 30, more specifically three rotor blades 30. The tower 10 extends along a longitudinal direction LD (see FIG. 2) with a total length L10 from a lower end 15 at the ground vertically upward to an upper end. The upper end forms a connection end 11 for the nacelle 20. The nacelle 20 is mounted onto the connection end 11 of the tower 10.

The nacelle 20 comprises a rotor hub 21. The rotor blades 30 are attached to the rotor hub 21 with their blade root 31, respectively. For the rotor blades 30, the blade root 31 is the "connection end" for attachment to the nacelle 20 (more precisely to its rotor hub 21). The rotor blades 30 each extend away from the blade root 31 along their longitudinal direction over a total length L30. In FIG. 1, the longitudinal direction for the rotor blades 30 is not shown separately. For the lower rotor blade 30, the longitudinal direction is parallel to an arrow indicating the total length L30.

The nacelle 20 contains a drive train comprising, for example, a gearbox 22 and a generator 23. During operation of the wind turbine 1, the drive train causes oscillations or vibrations. The vibrations are introduced into the tower 10 at the connection end 11 (the upper end) of the tower 10. They are also introduced in the blade roots 31 of the rotor blades 30 via the rotor hub 21. If no measures are taken, the tower 10 and the rotor blades 30 can act as the main emitters of sound emissions of disturbing tonalities.

For reducing the transmission of vibrations from the connection end 11 (the upper end) of the tower 10, on which the nacelle 20 rests, to a main area 13 of the tower 10, a vibration damper arrangement 40 is installed in an upper end section 12 of the tower 10. The end section 12 of the tower 10 is directly at the connection end 11 (the upper end) of the tower 10 with the nacelle 20. The end section 12 of the tower 10 at the connection end 11 forms, so to speak, a "tower head".

For the vibration damper assembly 40, the tower 10 forms an elongated first component for connection to a second component, namely the nacelle 20, at the connection end 11 of the tower 10.

For the vibration damping arrangements 140, the respective rotor blade 30 forms an elongated first component for connection to the second component, namely the nacelle 20, at the connection end, namely the corresponding blade root 31.

The tower 10 is at least partially "hollow". It forms at least sectionally a tower interior space. The rotor blades 30 may also be at least partially "hollow". They form at least sectionally a blade interior space, respectively.

FIG. 2 shows the vibration damper arrangement 40 in detail. It is installed completely in the tower head.

The vibration damper arrangement 40 comprises a plurality of damper groups 41*a*, 41*b*, 41*c*, 41*d*, 41*e*. Here, in an exemplary manner, five damper groups 41*a*, 41*b*, 41*c*, 41*d*, 41*e* are shown. All damper groups 41*a*, 41*b*, 41*c*, 41*d*, 41*e* are installed only in the end section 12 of the tower 10 at the connection end 11, i.e., in the tower head.

Each damper group 41*a*, 41*b*, 41*c*, 41*d*, 41*e* comprises a plurality of individual vibration dampers 42*a*, 42*b*, 42*c*, 42*d*, 42*e*. The individual vibration dampers 42*a*, 42*b*, 42*c*, 42*d*, 42*e* of the respective damper group 41*a*, 41*b*, 41*c*, 41*d*, 41*e* are installed on a circumferential wall 14 of the first component, in this case the tower 10. More precisely, in this example, they are fixed to an inner side of the circumferential wall 14. The individual vibration dampers 42*a*, 42*b*, 42*c*, 42*d*, 42*e* of the respective damper groups 41*a*, 41*b*, 41*c*, 41*d*, 41*e* are distributed along a circumferential direction CD, in this embodiment at equal intervals along the circumferential direction CD. The individual vibration dampers 42*a*, 42*b*, 42*c*, 42*d*, 42*e* of the respective damper groups 41*a*, 41*b*, 41*c*, 41*d*, 41*e* are arranged ring-shaped, more specifically in a ring-shaped manner around a longitudinal axis LA of the first component (in this case, the tower 10). Each of the damper groups 41*a*, 41*b*, 41*c*, 41*d*, 41*e* thus forms an individual "damper ring" with the plurality of associated individual vibration dampers 42*a*, 42*b*, 42*c*, 42*d*, 42*e*.

For example, a first damper group 41*a* (the first damper ring), which is closest to the connection end 11, comprises a plurality of first individual vibration dampers 42*a*. The first damper group 41 does not have to be installed directly on the connection end 11. However, it can be installed directly on the connection end 11 or directly near the connection end 11, for example. An adjacent second damper group 42_b_ (a second damper ring) comprises a plurality of second individual vibration dampers 42_b_, and so on.

The damper groups 41_a_, 41_b_, 41_c_, 41_d_, 41_e_ are spaced apart from each other along the longitudinal direction LD. In this example, all adjacent damper groups 41_a_, 41_b_, 41_c_, 41_d_, 41_e_ are evenly spaced from each other by a longitudinal distance LS. In modifications (not shown), the longitudinal distances between individual adjacent damping groups 41_a_, 41_b_, 41_c_, 41_d_, 41_e_ or all adjacent damping groups 41_a_, 41_b_, 41_c_, 41_d_, 41_e_ may differ.

In this embodiment, in the longitudinal distances LS between adjacent damper groups 41_a_, 41_b_, 41_c_, 41_d_, 41_e_, there respectively exists a "damper-free area" without individual vibration dampers 42_a_, 42_b_, 42_c_, 42_d_, 42_e_.

Each of the damper groups 41_a_, 41_b_, 41_c_, 41_d_, 41_e_ has its own natural frequency. The natural frequencies of all damper groups 41_a_, 41_b_, 41_c_, 41_d_, 41_e_ are different. This allows the vibration damper arrangement to reduce vibrations of several different frequencies and/or in several different frequency ranges. The individual natural frequencies be designed for a specific tonality, respectively.

In the present example, all individual vibration dampers 42_a_, 42_b_, 42_c_, 42_d_, 42_e_ each comprise a damper mass and a stiffness. The damper mass is attached to the circumferential wall 14 of the tower 10, in this case to an inner side of the peripheral wall 14, by means of the stiffness, for example a steel stiffness. The individual vibration dampers 42_a_, 42_b_, 42_c_, 42_d_, 42_e_ of a respective one of the damper groups 41_a_, 41_b_, 41_c_, 41_d_, 41_e_ have the same natural frequency, namely the natural frequency of this damper group 41_a_, 41_b_, 41_c_, 41_d_, 41_e_. The natural frequency of the individual vibration dampers 42_a_, 42_b_, 42_c_, 42_d_, 42_e_ and thus of the respective damper groups 41_a_, 41_b_, 41_c_, 41_d_, 41_e_ can be adjusted by means of a size of the damper mass and/or a stiffness and thus be specifically designed. According to one aspect, all individual vibration dampers 42_a_, 42_b_, 42_c_, 42_d_, 42_e_ of the same damper group 41_a_, 41_b_, 41_c_, 41_d_, 41_e_ can be of the same type, in particular identical in construction. This reduces costs.

Here, the individual vibration dampers 42_a_, 42_b_, 42_c_, 42_d_, 42_e_ of a respective damper group 41_a_, 41_b_, 41_c_, 41_d_, 41_e_ differ in their damper mass and/or stiffness from the individual vibration dampers 42_a_, 42_b_, 42_c_, 42_d_, 42_e_ of the other damper groups 41_a_, 41_b_, 41_c_, 41_d_, 41_e_.

According to a further aspect, individual (e.g.) vibration dampers 42_a_, 42_b_, 42_c_, 42_d_, 42_e_ with different natural frequencies are installed on the circumferential wall 14 in the end section 12 spaced apart from each other in series along the longitudinal direction LD. By repeating this linear "damping chain" along the circumferential direction CD, for example at uniform angular intervals around the longitudinal axis LA, the vibration damper arrangement 40 can be formed.

In FIG. 2, all individual vibration dampers 42_a_, 42_b_, 42_c_, 42_d_, 42_e_ are designed as passive vibration dampers. This makes the vibration damper arrangement 40 particularly cost-effective, simple, and reliable.

In general, the first damper group 41_a_ does not have to be located directly at or in the immediate vicinity of the connection end 11. However, it may optionally be implemented that at least the first damping group 41_a_ is arranged in a portion which extends in the longitudinal direction L10 from the connection end 11 over only 10% of the total length L10 of the first component (here the tower 10). In the embodiment shown in FIG. 2, the first damper group 41_a_ is even arranged directly at the connection end 11 or in the immediate vicinity of the connection end 11. Furthermore, at least the second damper group 41_b_ is also arranged in the portion which extends in the longitudinal direction L10 from the connection end 11 over only 10% of the total length L10 of the first component (here the tower 10). A third damper group 41_c_, which is adjacent to the second damper group 41_b_ in the longitudinal direction LD on the other side than the first damper group 41_a_, may also be arranged in this portion.

In this exemplary embodiment, the end section 12, in which all damper groups 41_a_, 41_b_, 41_c_, 41_d_, 41_e_ are arranged, extends from the connection end 11 over a maximum of 14% of the total length L10 of the first component 10 along the longitudinal direction LD, for example over a maximum of 14%. The main portion 13 of the first component, in this case the tower 10, is correspondingly large. Since the reduction in the transmission of vibrations takes place in the relatively short end section 12 directly at the connection end 11, a reduced proportion of the vibrations relevant to the tonalities does not even reach the much larger main portion 13. The main portion 13 can therefore not appear as a problematic acoustic emitter, or only to a greatly reduced extent. One advantage is that no damper groups 41_a_, 41_b_, 41_c_, 41_d_, 41_e_ and no individual vibration dampers 42_a_, 42_b_, 42_c_, 42_d_, 42_e_ need to be installed in the main portion 13. The main portion 13 is "damping-free" in the shown embodiment. This means considerably less effort and costs compared to a large-area damping of the tower 10.

The design of the vibration arrangement 40 generally depends on the dimensions, shape, and materials of the tower 10. The following describes merely exemplary embodiments.

It is assumed that a good reduction in the transmission of vibrations at 100 Hz shall be achieved for towers 10 are made (at least substantially) of steel and have total lengths L0 between 50 m and 150 m, average diameters between 3 m and 5 m, and average wall thicknesses (of the circumferential wall 14) between 2 cm and 5 cm, Then the longitudinal distance LS should be less than 300 cm, or even better, less than 110 cm. The individual vibration dampers 42_a_, 42_b_, 42_c_, 42_d_, 42_e_ of the respective damper groups 41_a_, 41_b_, 41_c_, 41_d_, 41_e_ should have a circumferential distance CS of less than 200 cm along the circumferential direction CD, or even better of less than 66 cm.

It is assumed that the tower 10 is (at least essentially) made of steel and is 50 m high, has an average diameter of 6 m and an average wall thickness of 3 cm. Furthermore, the vibration damper arrangement 40 should reduce the transmission of vibrations in a frequency range around 250 Hz. Then the longitudinal spacing LS should be less than 86 cm. The circumferential distance CS (along the circumferential direction CD) of the individual vibration dampers 42_a_, 42_b_, 42_c_, 42_d_, 42_e_ of the respective damper groups 41_a_, 41_b_, 41_c_, 41_d_, 41_e_ should be less than 55 cm.

It is assumed that the tower 10 is 100 m high, has an average diameter of 4 m, and an average wall thickness of 3 cm. Furthermore, the vibration damping arrangement 40 should reduce the transmission of vibrations in the range of 95 Hz to 105 Hz from the connection end 11 to the main area 13 by (at least) 10 dB. This can be achieved, for example, by the vibration damper arrangement 40 having a relative weight in the range of 0.1% to 0.2% compared to the weight of the tower 10. In an exemplary implementation, the vibration damper arrangement 40 consists of 80 damper groups 41_a_, 41_b_, 41_c_, 41_d_, 41_e_, each of which consists of approximately 280 individual vibration dampers 42_a_, 42_b_, 42_c_, 42_d_, 42_e_. In total, the vibration damper arrangement consists of approximately 22,400 individual vibration dampers 41*a*, 41*b*, 41*c*, 41*d*, 41*e*, each with a damper mass of 28 g. The end section 11 extends over only the uppermost 10 m of the tower 10. All 80 damper groups 41*a*, 41*b*, 41*c*, 41*d*, 41*e* are installed in the uppermost 10 m of the tower 10.

The vibration damper arrangements 140 at the blade roots 31 of the rotor blades 30 are constructed in the same way as the vibration damper arrangement 40 in the tower head. Due to the smaller dimensions of the rotor blades 30, the distances between the vibration damper arrangements 140 may also be different, in particular smaller. The design of the vibration damping arrangements 140 generally depends on the dimensions, shapes, and materials of the rotor blades 30. A merely exemplary embodiment is described below.

Assuming that the rotor blade 30 is (at least essentially) made of glass fiber reinforced plastic, 50 m long, has an average diameter in the range of 0.5 m to 1.5 m, and an average wall thickness between 1 cm and 3 cm. Furthermore, the vibration damper arrangement 140 should reduce the transmission of vibrations in a frequency range around 100 Hz. In this case, the longitudinal spacing of the damper groups should be less than 300 cm, or even better, less than 90 cm. The circumferential distance (along the circumferential direction) of the individual vibration dampers in the respective damper group should be less than 100 cm, or even better less than 34 cm.

What is claimed is:

1. A vibration damper arrangement for an elongated first component which is arranged at a connection end along a longitudinal direction of the first component for mechanical connection to a second component, wherein the second component is a wind turbine nacelle with a drive train, wherein the vibration damper arrangement comprises at least three damper groups which are arranged in an end section of the first component with the connection end and are spaced apart from one another along the longitudinal direction, wherein each of the damper groups comprises a plurality of individual vibration dampers which are arranged distributed along a circumferential direction on a circumferential wall of the first component, wherein a natural frequency of the respective individual vibration damper is designed by means of a damper mass and a stiffness of the individual vibration damper, wherein the vibration damper arrangement is configured to reduce the transmission of vibrations caused by vibrations in the drive train locally in the end section at the connection end, wherein the damper groups have natural frequencies differing from one another, wherein the individual vibration dampers of a respective damper group differ in their damper mass and/or their stiffness from the individual vibration dampers of the other damper groups, and wherein the respective damper group has a frequency reduction range around its natural frequency, wherein the frequency reduction range of a respective damper group overlaps with at least one of the frequency reduction ranges of another one of the damper groups.

2. The vibration damper arrangement according to claim 1, wherein the individual vibration dampers of the respective damper groups are arranged in a ring shape.

3. The vibration damper arrangement according to claim 1 wherein the first component is a wind turbine tower, and the connecting element is an upper end of the wind turbine tower for supporting the wind turbine nacelle.

4. The vibration damper arrangement according to claim 3, wherein adjacent damper groups are spaced apart by less than 300 cm along the longitudinal direction, and/or wherein the individual vibration dampers within the respective damper group are spaced apart from one another by less than 200 cm along the circumferential direction (CD).

5. The vibration damper arrangement according to claim 1, wherein the second component is the wind turbine nacelle with a rotor hub, characterized in that the first component is a wind turbine rotor blade, wherein the connection end is a blade root for attachment to the rotor hub.

6. The vibration damper arrangement according to claim 5, wherein adjacent damper groups are spaced apart by less than 300 cm along the longitudinal direction, and/or wherein the individual vibration dampers within the respective damper group are spaced apart by less than 100 cm along the circumferential direction.

7. The vibration damper arrangement according to claim 1, wherein the individual vibration dampers within the respective damper group have the same natural frequency and/or are of the same type.

8. The vibration damper arrangement according to claim 1, wherein the vibration damper arrangement is arranged completely in the end section.

9. The vibration damper arrangement according to claim 1, wherein at least one of the damper groups is arranged in a region which extends from the connection end over 10% of a total length of the first component along the longitudinal direction.

10. The vibration damper arrangement according to claim 9, wherein at least two of the damper groups are arranged in the region extending from the connection end over 10% of the total length of the first component along the longitudinal direction.

11. The vibration damper arrangement according to claim 1, wherein the end section extends from the connection end over a maximum of 14% of the total length of the first component along the longitudinal direction.

12. The vibration damper arrangement according to claim 1, wherein all individual vibration dampers are passive vibration dampers.

13. A wind turbine, characterized in that the wind turbine comprises the vibration damper arrangement according to claim 1.

* * * * *